(12) United States Patent
Yoon et al.

(10) Patent No.: US 8,385,662 B1
(45) Date of Patent: Feb. 26, 2013

(54) PRINCIPAL COMPONENT ANALYSIS BASED SEED GENERATION FOR CLUSTERING ANALYSIS

(75) Inventors: Sangho Yoon, San Mateo, CA (US); Jay Yagnik, Mountain View, CA (US); Mei Han, Cupertino, CA (US); Vivek Kwatra, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 943 days.

(21) Appl. No.: 12/432,989

(22) Filed: Apr. 30, 2009

(51) Int. Cl.
*G06K 9/62* (2006.01)
(52) U.S. Cl. ............... 382/225; 382/156; 382/190
(58) Field of Classification Search .......... 382/115, 382/116, 156
See application file for complete search history.

(56) References Cited

U.S. PATENT DOCUMENTS

| | | | |
|---|---|---|---|
| 5,081,656 A | 1/1992 | Baker et al. | |
| 5,325,449 A | 6/1994 | Burt et al. | |
| 5,488,674 A | 1/1996 | Burt et al. | |
| 5,497,430 A * | 3/1996 | Sadovnik et al. | 382/156 |
| 5,761,329 A * | 6/1998 | Chen et al. | 382/116 |
| 5,963,670 A | 10/1999 | Lipson et al. | |
| 6,005,247 A | 12/1999 | Baum | |
| 6,201,541 B1 | 3/2001 | Shalom et al. | |
| 6,249,616 B1 | 6/2001 | Hashimoto | |
| 6,253,173 B1 * | 6/2001 | Ma | 704/222 |
| 6,459,821 B1 | 10/2002 | Cullen | |
| 6,463,426 B1 | 10/2002 | Lipson et al. | |
| 6,466,694 B2 | 10/2002 | Kamada et al. | |
| 6,516,085 B1 | 2/2003 | Wiley et al. | |
| 6,535,650 B1 | 3/2003 | Poulo et al. | |
| 6,674,890 B2 | 1/2004 | Maeda et al. | |
| 6,675,174 B1 | 1/2004 | Bolle et al. | |
| 6,681,056 B1 | 1/2004 | Tseng et al. | |
| 6,683,984 B1 | 1/2004 | Simske et al. | |
| 6,762,769 B2 | 7/2004 | Xu et al. | |
| 6,826,300 B2 | 11/2004 | Liu et al. | |
| 6,898,331 B2 | 5/2005 | Tiana | |
| 7,006,671 B2 * | 2/2006 | Yamaguchi | 382/115 |
| 7,120,626 B2 | 10/2006 | Li et al. | |
| 7,315,642 B2 | 1/2008 | Bartov | |
| 7,376,251 B2 | 5/2008 | Stober | |
| 7,388,979 B2 | 6/2008 | Sakai et al. | |
| 7,447,338 B2 * | 11/2008 | Kim | 382/118 |
| 7,668,787 B2 * | 2/2010 | Bier | 706/11 |
| 7,697,746 B2 | 4/2010 | Kawaguchi | |
| 7,724,960 B1 | 5/2010 | Mikhael et al. | |
| 7,734,097 B1 | 6/2010 | Porikli et al. | |

(Continued)

OTHER PUBLICATIONS

Datta, R. et al., "Content-Based Image Retrieval-Approaches and Trends of the New Age," MIR, 2005, pp. 1-10.

(Continued)

*Primary Examiner* — Vu Le
*Assistant Examiner* — Aklilu Woldemariam
(74) *Attorney, Agent, or Firm* — Fenwick & West LLP

(57) ABSTRACT

Clustering algorithms such as k-means clustering algorithm are used in applications that process entities with spatial and/or temporal characteristics, for example, media objects representing audio, video, or graphical data. Feature vectors representing characteristics of the entities are partitioned using clustering methods that produce results sensitive to an initial set of cluster seeds. The set of initial cluster seeds is generated using principal component analysis of either the complete feature vector set or a subset thereof. The feature vector set is divided into a desired number of initial clusters and a seed determined from each initial cluster.

25 Claims, 10 Drawing Sheets

U.S. PATENT DOCUMENTS

| | | | |
|---|---|---|---|
| 7,778,488 | B2 | 8/2010 | Nord et al. |
| 7,783,102 | B2 | 8/2010 | Kawaragi |
| 7,941,004 | B2 | 5/2011 | Zhu et al. |
| 7,957,565 | B1* | 6/2011 | Sharma et al. .............. 382/115 |
| 8,001,157 | B2* | 8/2011 | Bier .............................. 707/802 |
| 8,005,292 | B2 | 8/2011 | Sakai et al. |
| 8,090,429 | B2 | 1/2012 | Vija et al. |
| 8,103,090 | B2 | 1/2012 | Ma et al. |
| 8,131,786 | B1 | 3/2012 | Bengio et al. |
| 2001/0055429 | A1 | 12/2001 | Hirosawa et al. |
| 2003/0142860 | A1 | 7/2003 | Glasser et al. |
| 2003/0169906 | A1* | 9/2003 | Gokturk et al. .............. 382/115 |
| 2003/0190090 | A1 | 10/2003 | Beeman et al. |
| 2004/0032979 | A1 | 2/2004 | Honda et al. |
| 2005/0100209 | A1* | 5/2005 | Lewis et al. .................. 382/159 |
| 2005/0149494 | A1 | 7/2005 | Lindh et al. |
| 2005/0163397 | A1 | 7/2005 | Baldwin |
| 2005/0179910 | A1 | 8/2005 | Bartov |
| 2006/0017739 | A1 | 1/2006 | Fang et al. |
| 2006/0023944 | A1 | 2/2006 | Oisel et al. |
| 2006/0215882 | A1 | 9/2006 | Ando et al. |
| 2007/0050411 | A1 | 3/2007 | Hull et al. |
| 2007/0183629 | A1 | 8/2007 | Porikli et al. |
| 2007/0269107 | A1 | 11/2007 | Iwai et al. |
| 2007/0280556 | A1 | 12/2007 | Mullick et al. |
| 2007/0282935 | A1* | 12/2007 | Khan et al. .................... 708/270 |
| 2007/0297653 | A1 | 12/2007 | Bolle et al. |
| 2008/0118151 | A1 | 5/2008 | Bouguet et al. |
| 2008/0118160 | A1 | 5/2008 | Fan et al. |
| 2008/0130960 | A1 | 6/2008 | Yagnik |
| 2008/0235216 | A1 | 9/2008 | Ruttenberg |
| 2009/0274385 | A1 | 11/2009 | Zhu et al. |
| 2011/0035035 | A1* | 2/2011 | Khan et al. ...................... 700/94 |
| 2011/0158533 | A1 | 6/2011 | Gutelzon et al. |
| 2011/0202528 | A1* | 8/2011 | Deolalikar et al. .......... 707/737 |
| 2011/0280453 | A1 | 11/2011 | Chen et al. |
| 2012/0020546 | A1 | 1/2012 | Inoue et al. |
| 2012/0141044 | A1 | 6/2012 | Kwatra et al. |

OTHER PUBLICATIONS

Deselaers, T. et al., "Features for Image Retrieval: An Experimental Comparison," Information Retrieval, 2008, pp. 1-22, vol. 11, No. 2.

Deselaers, T. et al., "Content-Based Image Retrieval, Tutorial Image Retrieval," Tutorial ICPR, 2008, pp. 1-66.

Idrissi, K. et al., "Multi-Component Entropy Segmentation for Color Image Retrieval," Image and Signal Processing and Analysis, 2001, pp. 132-137.

Ke, Y. et al., "Efficient Near-Duplicate Detection and Sub-Image Retrieval," ACM Multimedia, 2004, pp. 1-9.

Oliva, A. et al., "Building the Gist of a Scene: The Role of Global Image Features in Recognition," Progress in Brain Research, 2006, pp. 1-19.

Rahman, M. et al., "A Feature Level Fusion in Similarity Matching to Content-Based Image Retrieval," 2006 9$^{th}$ International Conference on Information Fusion, 2006, pp. 1-6.

Raoui, Y. et al., "Global and Local Image Descriptors for Content Based Image Retrieval and Object Recognition," Applied Mathematical Sciences, 2010, pp. 2109-2136, vol. 5, 2011, No. 42.

Smeulders, A. et al., "Content-Based Image Retrieval at the End of the Early Years," IEEE Transactions on Pattern Analysis and Machine Intelligence, 2000, pp. 1349-1380, vol. 22, No. 12.

Yang, J. et al., Evaluating Bag-of-Visual-Worlds Representations in Scene Classification, MIR, 2007, pp. 197-206.

"Iteratively reweighted least squares," Wikipedia, Last Modified Jun. 23, 2009, 2 pages, [online] [Retrieved on Jul. 14, 2009] Retrieved from the internet <URL:http://en.wikipedia.org/wiki/Iteratively_reweighted_least_squares>.

Boiman, O., et al., In defense of nearest-neighbor based image classification, IEEE Conference on Computer Vision and Pattern Recognition, Jun. 23-28, 2008, pp. 1-8.

Dai, S., et al., "Soft edge smoothness prior for alpha channel super resolution," IEEE Conference on Computer Vision and Pattern Recognition, 2007, 8 pages.

Efros, A., et al., "Image quilting for texture synthesis and transfer," Computer Graphics Annual Conference (SIGGRAPH 2001); Los Angeles, CA; United States; Aug. 12-17, 2001. pp. 341-346.

Efros, A., et al., "Texture Synthesis by Non-parametric Sampling," 7$^{th}$ IEEEE International Conference on Computer Vision, Sep. 20-27, 1999, 10 Pages.

Elad, M., et al., "Restoration of single super-resolution image from several blurred, noisy and down-sampled measured images," IEEE Transactions on Image Processing, Dec. 1997, pp. 1646-1658, vol. 6, No. 12.

Elkan, C., Using the triangle inequality to accelerate k-means, Proceedings of the Twentieth International Conference on Machine Learning (ICML-2003), Washington DC, 2003, 7 pages.

Farsiu, S., et al., "Fast and robust multiframe super resolution," IEEE Transactions on Image Processing, Oct. 2004, pp. 1327-1344, vol. 13, Is. 10.

Finlayson, G.D., et al., Removing shadows from images, ECCV 2002: European Conference on Computer Vision, 2002, 14 pages.

Freeman, W.T., et al., "Example-based super resolution," IEEE Computer Graphics and Applications, 2002, 14 pages.

Grauman, K., et al., "Approximate correspondence in high dimensions," In NIPS, 2006, 8 pages.

Han, J., et al., "Fast example-based surface texture synthesis via discrete optimization," The Visual Computer, 2006, pp. 918-925, vol. 22.

Hays, J., et al., "Scene completion using millions of photographs," ACM Transactions on Graphics GRAPH, 2007, vol. 26, No. 3.

Irani, M., et al., "Motion analysis for image enhancement: Resolution, occlusion and transparency," Journal of Visual Communication and Image Representation, 1993, 24 pages.

Korah, T., et al., "Analysis of building textures for reconstructing partially occluded facades," European Conference on Computer Vision, 2008, 14 pages.

Kumar, N., et al., "What is a good nearest neighbors algorithm for finding similar patches in images," ECCV, 2008.

Kwatra, V., et al., "Graphcut textures: Images and video synthesis using graph cuts," ACM Transactions on Graphics, Jul. 2003, pp. 277-286, vol. 22, No. 3.

Kwatra, V., et al, "Texture optimization for example-based synthesis," ACM Transactions on Graphics, SIGGRAPH, 2005, pp. 795-802, vol. 24, No. 3.

Lefebvre, S., et al., "Parallel controllable texture synthesis," ACM SIGGRAPH, 2005, pp. 777-786.

Liu, F., "Texture-consistent shadow removal," ECCV. 2008.

Mohan, A., et al., "Editing soft shadows in a digital photograph," IEEE Computer Graphics and Applications, 2007, pp. 23-31, vol. 27, No. 2.

Muller, P., et al., "Image -based procedural modeling of facades," ACM Transactions on Graphics, Jul. 2007, pp. 85-1 to 85-10, vol. 26, No. 3.

Park, M., et al., "Deformed Lattice Detection via Mean-Shift Belief Propagation," European Conference on Computer Vision (ECCV), Oct. 2008, pp. 474-485.

Pauly, M., et al., "Discovering structural regularity in 3rd geometry," ACM Transactions on Graphics, 2008, 11 Pages.

Salvador, E., et al., "Cast shadow segmentation using invariant color features, Computer vision and image understanding," Computer Vision and Image Understanding, 2004, pp. 238-259, vol. 95.

Schindler, G., et al. "Detecting and matching repeated patterns for automatic geo-tagging in urban environments," Computer Vision and Pattern Recognition, CVPR, 2008, pp. 1-7.

Shotton, J., et al., "Semantic texton forest for image categorization and segmentation," Computer Vision and Pattern Recognition, CVPR, 2008, pp. 1-8.

Sun, J., et al., "Image hallucination with primal sketch priors," Computer Vision and Pattern Recognition, 2003, 8 pages.

Torralba, A., et al., "Context-based vision system for place and object recognition," Proceedings. Ninth IEEE International Conference, Oct. 13-16, 2003, pp. 273-380, vol. 1.

Vazquez, E., et al., "Image segmentation in the presence of shadows and highlights," Computer Vision—ECCV, 2008, 14 pages.

Wang, Q., et al., "Patch based blind image super resolution," ICCV 2005. Tenth IEEE International Conference, Oct. 17-21, 2005, pp. 709-716, vol. 1.

Wang, H., et al., "Factoring repeated content within and among images," International Conference on Computer Graphics and Interactive Techniques, ACM SIGGRAPH 2008, 10 pages.

Wu, T., et al., "Natural shadow matting," ACM Transactions on Graphics, Jun. 2009, Pages , vol. 26, Issue 2, Article 8.

Zhao, T., et al., "Segmentation and tracking of multiple humans in complex situations," CVPR, 2001, 8 Pages.

Cao, G., et al., "Covariance estimation for high dimensional data vectors using the sparse matrix transform," In Daphne Koller, Dale Schuurmans, Yoshua Bengio, and Lon Bottou, editors, NIPS, pp. 225-232. MIT Press, 2008.

Higham, N. J., "Computing the nearest correlation matrix a problem from finance," IMA Journal of Numerical Analysis, 22(3):329-343, 2002.

Jain, A. K., et al., "Statistical pattern recognition: A review," IEEE Transactions on Pattern Analysis and Machine Intelligence, 22(1):4-37, 2000.

Porikli, W. F., et al., "Fast construction of covariance matrices for arbitrary size image windows," In Proc. Intl. Conf. on Image Processing, pp. 1581-1584, 2006.

Qi, J., et al., "Fast computation of the covariance of map reconstructions of pet images," vol. 3661, pp. 344-355, 1999.

Stein, C., et al., "Improving the usual estimator of a normal covariance matrix," Dept. of Statistics, Stanford University, Report 37, 1972.

* cited by examiner

PRINCIPAL COMPONENT ANALYSIS BASED SEED GENERATION FOR CLUSTERING ANALYSIS

FIELD OF THE INVENTION

This invention relates to computer-implemented systems and methods for the classification of data and more particularly to clustering methods for classifying data.

BACKGROUND

Many engineering applications require classification or categorization of objects representing real world entities based on features of the entities. Examples of such applications include processing media objects representing audio, video or graphics data, categorizing documents, analyzing geographical data, rendering maps, analysis of medical images for diagnosis and treatment, analysis of biological and chemical data samples, and the like. All real world entities have spatial and/or temporal characteristics which are used for classifying the entities. These characteristics are themselves represented as features of data objects that likewise have spatial and/or temporal characteristics. For example, a media object comprises data elements with spatial and/or temporal characteristics, in that the data elements have a spatial (distance between pixels within an individual image) and/or temporal extent (pixels values over time). Features derived from these characteristics are used for classification. For example, in image analysis, changes in pixel hue, saturation, or luminosity (either spatial within the image or temporal across images) are used to identify useful information about the image, whether to detect a person's face in a photograph, a tumor in a radiological scan, or the motion of an intruder in a surveillance video. Similarly, in signal processing of audio signals, changes in signal amplitude, frequency, phase, energy, and the like are used to classify signals and detect events of interest. In general then, classification of objects inherently relies on the data for the objects representing spatial and/or temporal characteristics of the objects themselves.

Examples of classification algorithms include clustering algorithms that assign objects to groups based on similarity of features of the objects. Certain clustering algorithms use an initial set of cluster seeds for computing clusters of a data set, for example, k-means clustering algorithm. The results obtained from these clustering algorithms can vary significantly depending on the choice of the initial cluster seeds. In some cases, the initial seeds are using pseudo-random or other stochastic processes. As a result, the generated clusters may correspond to a locally optimal solution depending on the initial cluster selection. To improve the quality of results, these algorithms are run with multiple initial cluster seeds and the best result selected. However, running the clustering algorithm multiple times with different initial sets of cluster seeds is a computationally intensive process, and typically only a limited number of initial cluster seed configurations can be used. Further, this approach is merely a heuristic approach in that is does not ensure that the resulting cluster seeds are optimally selected.

SUMMARY

Methods, systems and computer program products allow clustering of entities with spatial and/or temporal characteristics. The entities are represented as multi-dimensional feature vectors. These feature vectors are stored in a database. A subset of the feature vectors is selected; the subset can include all or just a portion of the stored feature vectors. A set of initial cluster seeds is determined using a principal component analysis (PCA) algorithm of the subset of the feature vectors. The initial cluster seeds are selected based on their attributes in the principle components domain, rather than merely in the underlying feature domain. Clustering of the entities is performed using a clustering algorithm that uses the initial cluster seeds. The use of principal component analysis allows selection of initial cluster seeds that produce better results of the clustering algorithm compared to a random seed selection. The use of principal component analysis aims at generating clusters that provide optimal separation between clusters based on variance as a measure of separation. In one embodiment, the clustering algorithm is a k-means clustering algorithm.

One embodiment of the PCA selection hierarchically divides the feature vectors into a set of initial clusters. The selection of initial cluster seeds identifies a seed vector from each cluster as an initial cluster seed. The seed vector identified from each cluster as an initial cluster seed is the centroid of an initial cluster. A tree-structured cluster seed selection algorithm achieves hierarchical division of the feature vectors by using k-means clustering for dividing clusters. The initial seeds for the k-means clustering algorithm used for dividing clusters are selected such that a vector computed by principal component analysis passes through all the initial seeds. The vector may be computed by principal component analysis of either the entire set of feature vectors or the feature vectors of the cluster.

In another embodiment, feature vectors are projected onto principal components computed based on the feature vectors. The distribution of the projected feature vectors along a principal component is used to partition the feature vectors into smaller subsets. Since the projected feature vectors lie along a principal component, computing the distribution of projected feature vectors is less intensive than computing the distribution of the feature vectors themselves. In one embodiment, the distribution of the projected feature vectors is computed by calculating the mean of the projected feature vectors and partitioning the feature vectors based on the orientation of the projected feature vectors with respect to the mean. The method of dividing a cluster into smaller clusters by computing the distribution of projected feature vectors along a principal component can be used for hierarchical division of clusters into smaller clusters. The hierarchical division of the clusters based on distribution of projected feature vectors can be represented as a k-d tree.

In another embodiment, the feature vectors are mapped to tuples such that a tuple component is determined by the distribution of the projected feature vectors along a principal component computed based on the feature vectors. All feature vectors mapped to a tuple are assigned to an initial cluster used for selecting an initial cluster seed. In one embodiment, the tuple corresponding to a feature vector is a bit vector such that a tuple component has a binary value.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
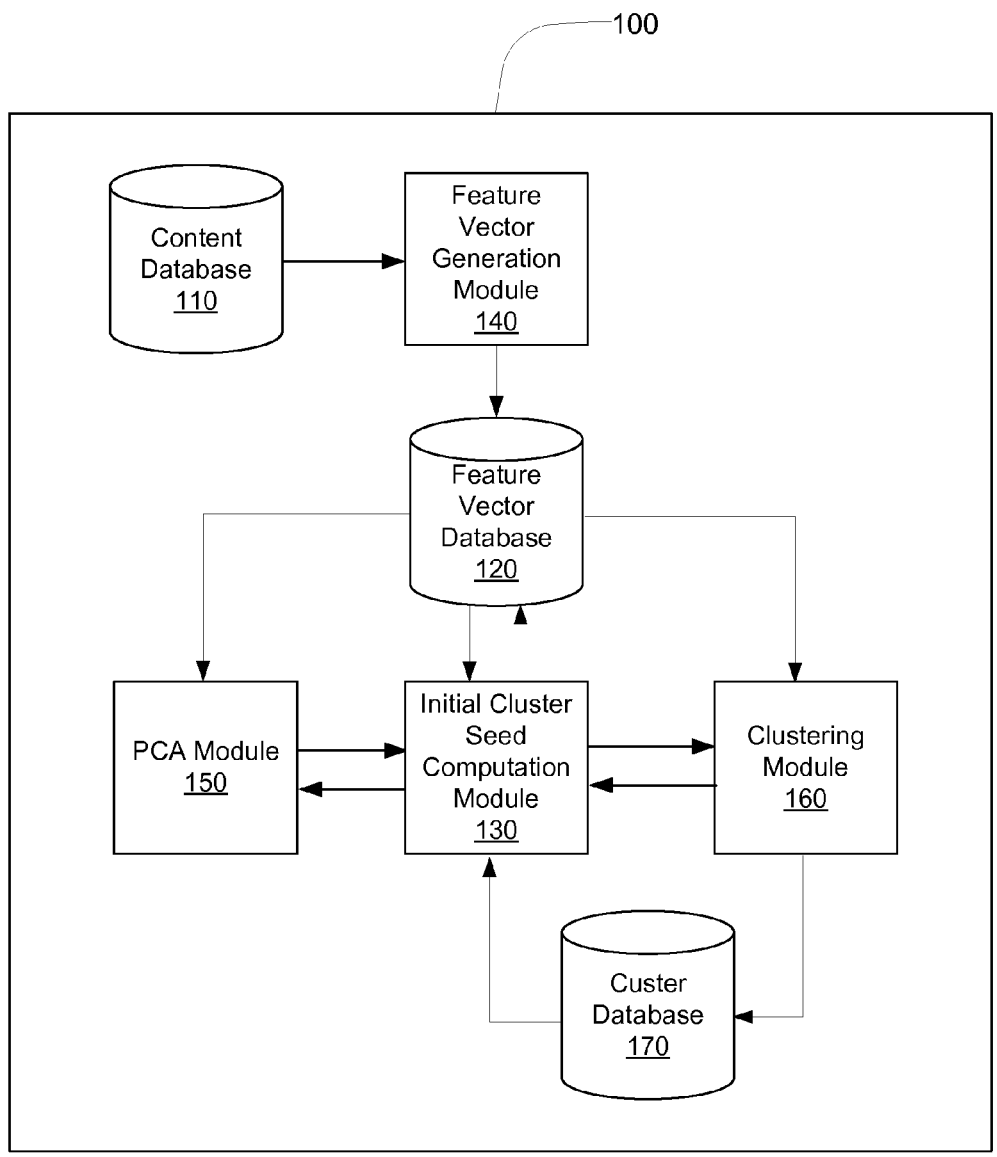
FIG. 1 is the architecture of a system that performs clustering of objects according to one embodiment.

FIG. 1 shows the system architecture for clustering of objects according to one embodiment. FIG. 1 shows component modules used by system 100. In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable storage medium (e.g., hard disk), loaded into the memory (also a computer readable storage medium), and executed by one or more processors included as part of the clustering analysis system 100. Alternatively, hardware or software modules may be stored elsewhere within the clustering analysis system 100. As will become apparent, the various data processing operations described herein are sufficiently complex and time consuming as to necessarily require the operation of a computer system such as the system 100 in order to practice the present invention.

The content database 110 stores objects corresponding to real world entities that need to be clustered, for example, media objects such as audio, video, or image objects. Real world entities have spatial and/or temporal characteristics, and thus the data of the objects representing these entities likewise has spatial and/or temporal characteristics as well. The characteristics of the entities, as stored in the data, are represented as features. According to Information Theory as is commonly accepted in the scientific community, that data (information) itself is physical and has measurable physical qualities, particularly entropy. See, Shannon, C. E. (1948), "A Mathematical Theory of Communication", *Bell System Technical Journal,* 27, pp. 379-423 & 623-656, July & October, 1948, and R. Landauer, Information is Physical *Proc. Workshop on Physics and Computation PhysComp* '92 (IEEE Comp. Sci. Press, Los Alamitos, 1993) pp. 1-4. An entity is associated with a feature vector representing the features of the entity.

The feature vector generation module 140 identifies the features of an entity used for clustering analysis and computes the corresponding feature vector. These features are derived from the data of the objects that represent the entities. The feature vector generation module 140 reads the data associated with entities from the content database 110 and stores the computed feature vectors in the feature vector database 120. For example, the feature vector of an entity with spatial characteristics may represent the spatial coordinates of the entity, or spatial aspects internal to the data representing the entity. Similarly, the feature vector of an entity with temporal characteristics may represent temporal information associated with the entity, for example, time of occurrence of events associated with the entity, or temporal aspects internal to the data representing the entity.

The principal component analysis (PCA) module 150 applies a principal components analysis algorithm to a given set of feature vectors to compute the principal components thereof. The PCA module 150 receives as input a set of feature vectors from a module requesting principal components of such a set, and returns a data set comprising generated principal components to the requesting module. In some embodiments, the module requesting principal components provides as input, a pointer to a set of feature vectors stored in the feature vector database 120.

The initial cluster seed computation module 130 computes the initial cluster seeds for input to a clustering algorithm in accordance with an embodiment, for example, a k-means clustering algorithm. The initial cluster seed computation module 130 reads a set of feature vectors from the feature vector database 120 and provides the generated initial cluster seeds to a clustering module 160. The initial cluster seed computation module 130 uses the PCA module 150 for performing principal component analysis of feature vector sets to obtain the principal components of a set of feature vectors. The initial cluster seed computation module 130 then generates a set of initial cluster seeds based upon the principal components of the set of feature vectors. The initial cluster seed computation module 130 also uses the clustering module 160 for computing intermediate clusters for use in generation of initial cluster seeds. In some embodiments, the initial cluster seed computation module 130 augments feature vectors with information used for generating initial cluster seeds and stores the additional information in feature vector database 120. For example, the feature vectors may be augmented with bit-vectors computed using principal component analysis by the PCA module 150. Three different embodiments of the initial cluster seed computation module 130 are described below that provide three different methods of using the principal components generated by the PCA module 150 to generate the initial cluster seeds. These methods include Tree-Structured Generation of Cluster Seeds, PCA-based Bit- Vector Generation of Cluster Seeds, and K-d Tree Based Partitioning for Generation of Cluster Seeds. The initial cluster seed computation module 130 can be configured to implement any combination of one or more of these methods.

The clustering module 160 performs a clustering algorithm, for example the k-means clustering algorithm, to generate clusters from a set of feature vectors. The clustering module 160 reads the feature vectors from the feature vector database 120, receives a set of initial cluster seeds from the initial cluster seed computation module 130, and stores the generated clusters in the cluster database 170. The clustering module 160 can be used for generation of the result clusters for the overall set of feature vectors or it can be used for generating intermediate clusters for generation of initial seed clusters by the initial cluster seed computation module 130.

The cluster database 170 stores clusters of feature vectors generated by the clustering module 160. The stored clusters can be the final result of clustering of the input set of feature vectors or intermediate results used by initial cluster seed computation module 130. The cluster database 170 stores appropriate structures to organize clusters, for example, a hierarchical tree for organizing clusters obtained by hierarchical division of a set of feature vectors or a k-d tree structure.

It should also be appreciated that in practice at least some of the components of the clustering analysis system 100 may be distributed over multiple computers, communicating over a network. For example, the initial cluster seed computation module 130 and the k-means clustering module 160 may be deployed over multiple computer servers. For convenience of explanation, however, the components of the clustering analysis system 100 are discussed as though they were implemented on a single computer.

In another embodiment, the content database 110 and/or the feature vector database 120 may be located on a separate system that is coupled to the clustering analysis system 100 by a network. The clustering analysis system 100 also includes one or more input/output devices that allow data to be input and output to and from the system. It will be understood that embodiments of the clustering analysis system 100 also includes standard software and hardware components such as operating systems and the like and further include standard hardware components (e.g., network interfaces, storage devices, etc.) not shown in the figure for clarity of example.

Tree-Structured Generation of Cluster Seeds

Figure 2:
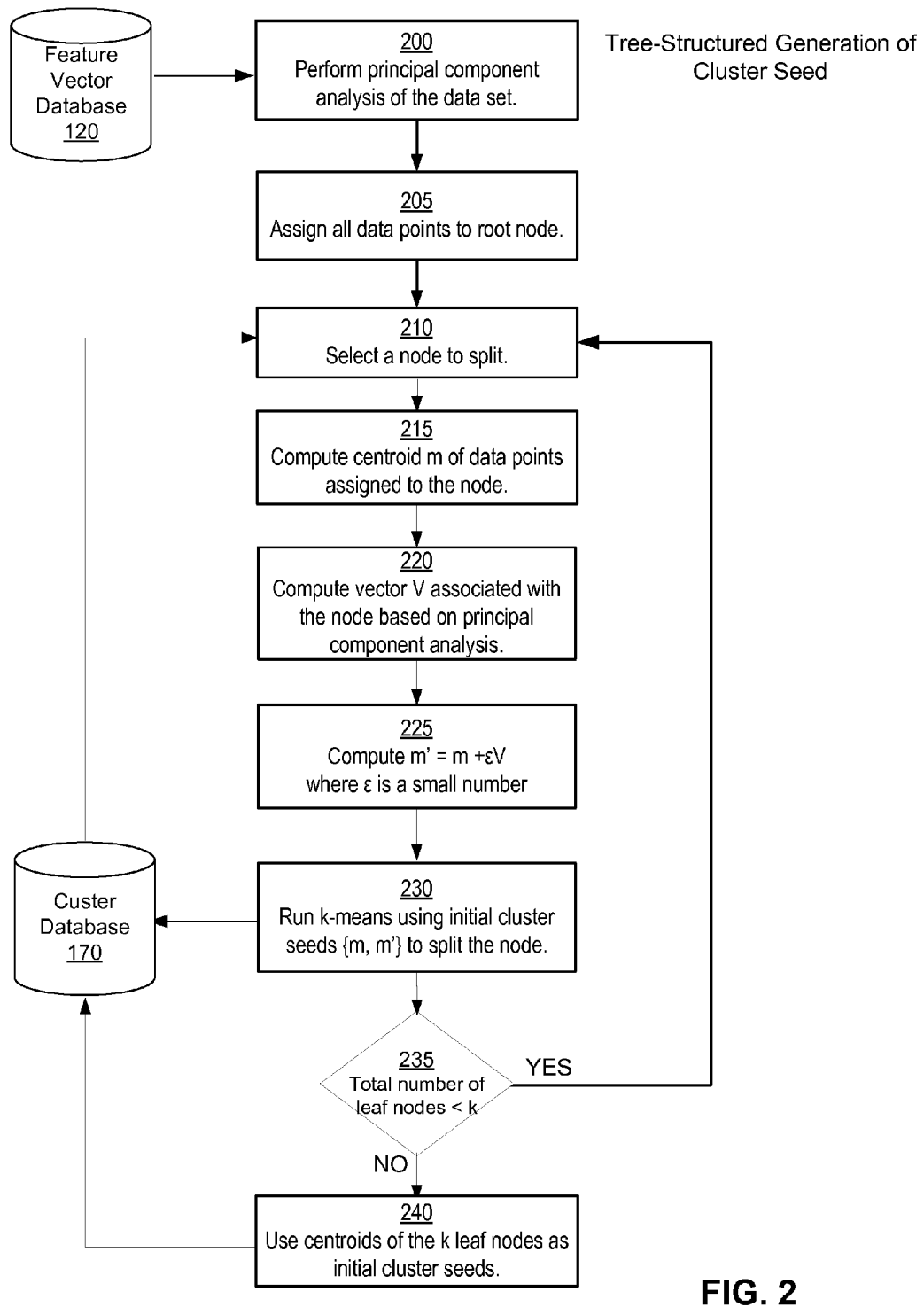
FIG. 2 is a flowchart of the process illustrating generation of cluster seeds using tree-structured hierarchical decomposition of data using principal component analysis.

In a first set of embodiments, the initial cluster seed computation module 130 performs a tree-structured generation of cluster seeds by hierarchically dividing the clusters into smaller clusters until a desired number of clusters are obtained. FIG. 2 shows a flowchart of the process illustrating generation of cluster seeds using the tree-structured hierarchical decomposition of data, as performed by an embodiment of the initial cluster seed computation module 130. The initial cluster seed computation module 130 uses the PCA module 150 to compute principal component vectors of input feature vectors. Some embodiments of initial cluster seed computation module 130 use the principal components of the entire set of feature vectors and others use the principal components of the cluster being partitioned. The principal component vectors are used by the initial cluster seed computation module 130 to compute the initial seed vectors for partitioning the clusters. The seed vectors are selected such that the coordinates of the seeds in the multidimensional vector space lie along a principal component vector associated with the feature vectors. The initial cluster seed computation module 130 provides the seed vectors as input to the clustering module 160 for partitioning a node using a clustering algorithm, for example, k-means clustering algorithm. The performance of an embodiment of initial cluster seed computation module 130 and the quality of clusters obtained depends on how principal component analysis is used for computing the seed vectors.

As shown in FIG. 2, the initial cluster seed computation module 130 selects a set of the input feature vector set stored in the feature vector database 120 (which set can be all of, or a subset of the feature vectors), and provides the selected set to the PCA module 150 to perform 200 a principal component analysis thereon. The principal component analysis results in generation of one or more principal component vectors V associated with the input feature vector set.

The initial cluster seed computation module 130 generates a hierarchical tree such that each node of the tree corresponds to a cluster of the feature vectors. The structures representing the hierarchical tree and the clusters corresponding to the nodes of the tree are stored in the cluster database 170. In some embodiments, the hierarchical tree is not explicitly represented and instead other data structures are used to represent the clusters. A cluster corresponding to a tree node is a subset of the clusters corresponding to the ancestors of the tree node. The tree is initialized with a root node and all the feature vectors are assigned 205 to the root node. A leaf node is selected 210 for being split into smaller nodes (splitting of a node refers to splitting of the cluster corresponding to the node). In some embodiments, the leaf node with the maximum number of feature vectors assigned to it is selected. Another embodiment selects a leaf node based on the criteria that the tree is kept height balanced as far as possible. In the first iteration, since there is only one node—the root node, the root node is selected for being split. A clustering algorithm, for example, k-means clustering algorithm is used for splitting each node.

The initial cluster seed computation module 130 identifies initial cluster seeds for the k-means algorithm used for splitting each node. The centroid m of the feature vectors associated with the identified node is computed 215 and used as a first seed. A second seed for the k-means algorithm is computed as a point situated a small distance from the first seed in the direction of a principal component vector V computed 220 by the PCA module 150. The initial cluster seed computation module 130 computes 225 the second seed as m'=(m+εV) where m represents the first seed at the centroid of the cluster and ε is a small number. Example values of ε include $10^{-3}$, $10^{-4}$, or $10^{-5}$ for a normalized principal component vector.

The initial cluster seed computation module 130 provides the initial seeds corresponding to a node to the clustering module 160 to run 230 k-means algorithm for splitting the node. The clustering module 160 creates clusters as a result of partitioning and adds the clusters to the cluster database 170. The clustering module 160 also creates leaf nodes corresponding to the partitioned clusters and adds the leaf nodes as child nodes of the node that is split and updates the hierarchical tree structure stored in the cluster database 170.

The total number of clusters is the number of leaf nodes of the hierarchical tree stored in the cluster database 170. If the total number of clusters desired is k, the initial cluster seed computation module 130 compares 235 the current number of leaf nodes with k. If the current number of leaf nodes is less than k, the initial cluster seed computation module 130 continues dividing clusters into smaller clusters. The centroids of the clusters corresponding to the k leaf nodes are provided by the initial cluster seed computation module 130 to the clustering module 160 for use 240 as the initial seed cluster for clustering the overall set of feature vectors.

The vector V used for computing the initial seeds for dividing a cluster into smaller clusters is computed using principal component analysis of either the entire set of feature vectors or the feature vectors of the cluster being partitioned. In one embodiment, initial cluster seed computation module 130 uses the first principal component vector of the cluster being partitioned for computing the initial seeds for partitioning a cluster. The first principal component vector of a set of feature vectors corresponds to the direction of maximum variance of the feature vectors. This increases the likelihood of obtaining better partitions. However determining the principal components for each cluster is a computationally intensive operation.

Figure 3:
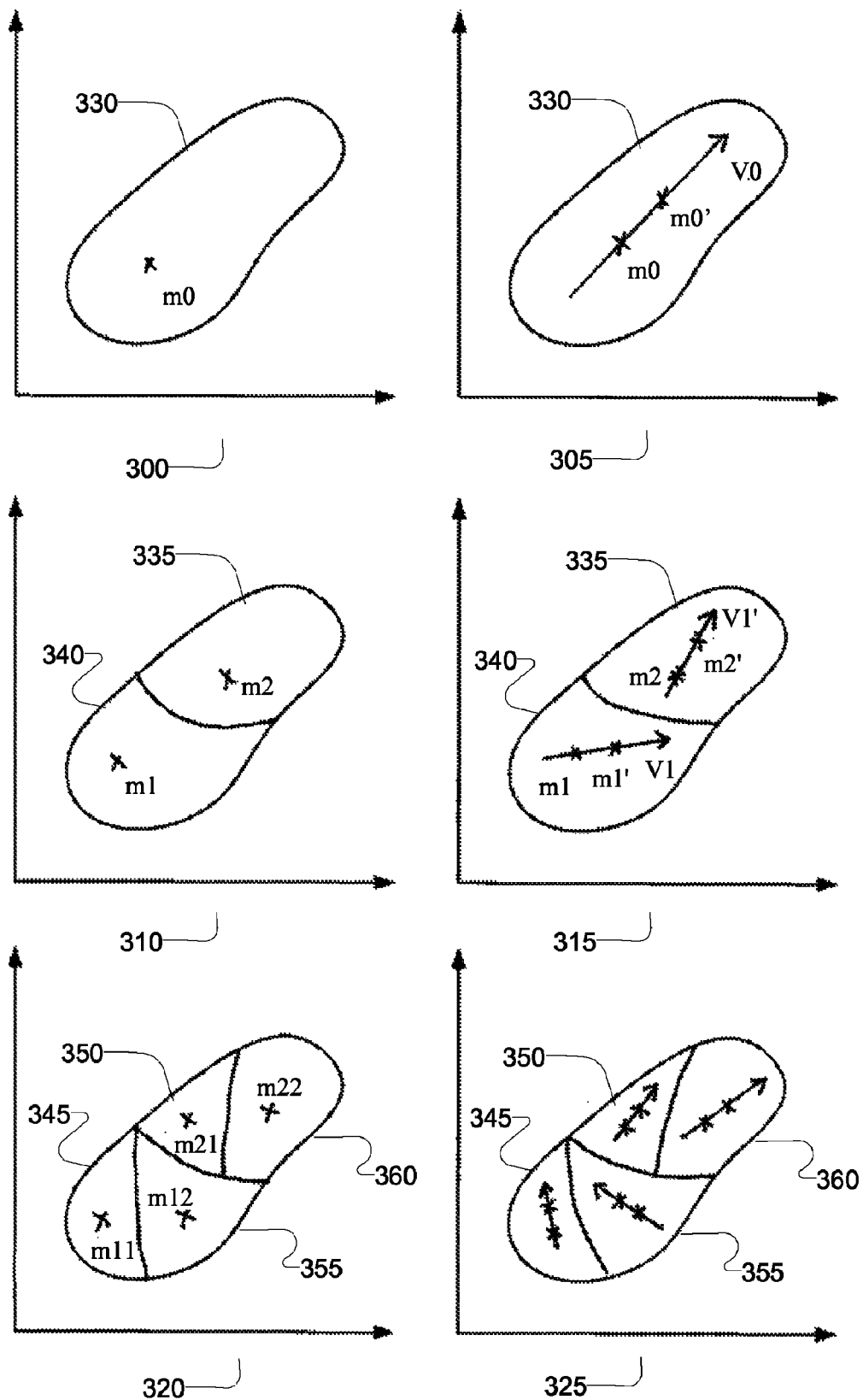
FIG. 3 illustrates an embodiment of the tree-structured hierarchical decomposition method that re-computes the principal component for each cluster being divided.

FIG. 3 illustrates the embodiment of initial cluster seed computation module 130 using various snapshots of the data at different steps of the algorithm. The snapshot 300 shows the overall data set as the first cluster 330 for the root node with the centroid m0. The vector V0 in snapshot 305 indicates the first principal component of the cluster 330 computed by PCA module 150. The initial cluster seed computation module 130 computes the seed m0'=m0+εV0 and provides the set of initial seeds {m0, m0} to the clustering module 160 to partition the cluster 330 into clusters 335 and 340. The procedure to partition is repeated for the clusters 335 and 340. The centroids m1 and m2 of the clusters 335 and 340 respectively are computed by the initial cluster seed computation module 130. The vector V1' is the first principal component of the cluster 335 and vector V1 is the first principal component of the cluster 340 both computed by PCA module 150. The corresponding vectors are used by the initial cluster seed computation module 130 to generate the initial seeds {m1, m1} and {m2, m2} for partitioning the clusters 340 and 335 respectively. The clusters 335 and 340 are further partitioned by the clustering module 160 to obtain clusters 350, 360 and clusters 345, 355 respectively. Snapshot 325 illustrates how initial cluster seed computation module 130 continues partitioning the clusters 345, 350, 355, and 360 by computing their first principal components.

Figure 4:
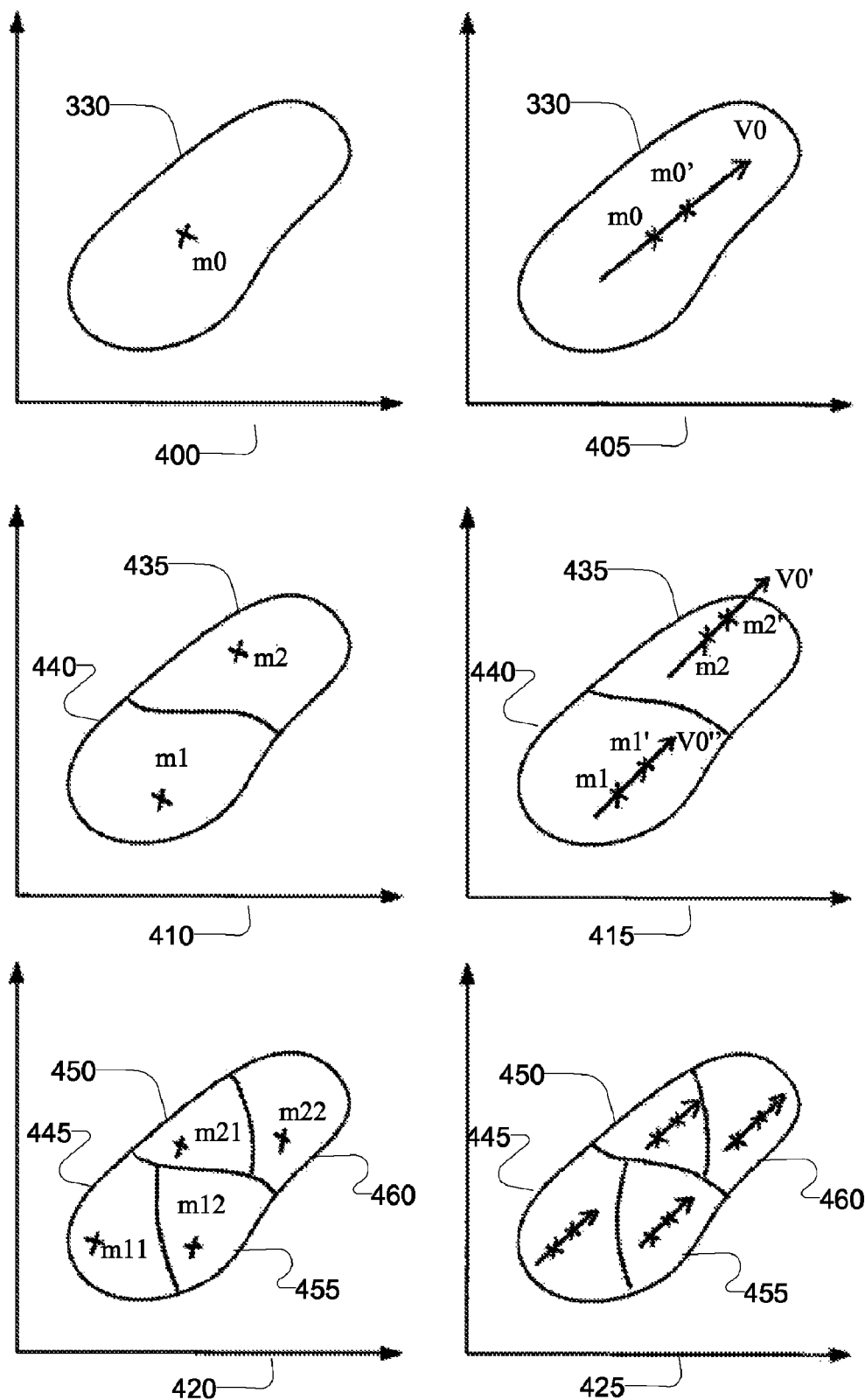
FIG. 4 illustrates an embodiment of the tree-structured hierarchical decomposition method that uses the first principal component of the overall set for partitioning each cluster.

FIG. 4 illustrates another embodiment of initial cluster seed computation module 130 that uses the first principal component of the overall set of feature vectors for partitioning every node in the hierarchical tree representing the division of clusters. This embodiment is less computation intensive compared to the previous embodiment that computes the first principal component for each cluster since the principal component analysis is performed only once for the overall set of feature vectors and then reused. However, the resulting clusters obtained from this embodiment may be inferior to the clusters obtained by the embodiment that computes the first principal component for each cluster. The snapshot 400 shows the overall data set as the first cluster 330 for the root node with the centroid m0. The vector V0 in snapshot 305 indicates the first principal component of the cluster 330 computed by the PCA module 150. The initial cluster seed computation module 130 computes the seed m0'=m0+εV0 and provides the set of initial seeds {m0, m0} to the clustering module 160. The clustering module 160 runs the k-means algorithm to partition the cluster 330 into two clusters 435 and 440. The procedure to partition is repeated for clusters 435 and 440. The initial cluster seed computation module 130 computes the centroids m1 and m2 of the clusters 435 and 440 respectively as shown in snapshot 410. The initial cluster seed computation module 130 generates the initial seeds {m1, m1} and {m2, m2} using the vectors V0' and V0" parallel to vector V0 and provides them to the clustering module to partition the cluster 435 and 440. The clustering module 160 partitions the cluster 435 to obtain clusters 450 and 460 and partitions cluster 440 to obtain clusters 445 and 455 as shown in snapshot 420. Snapshot 425 illustrates how the process continues.

Figure 5:
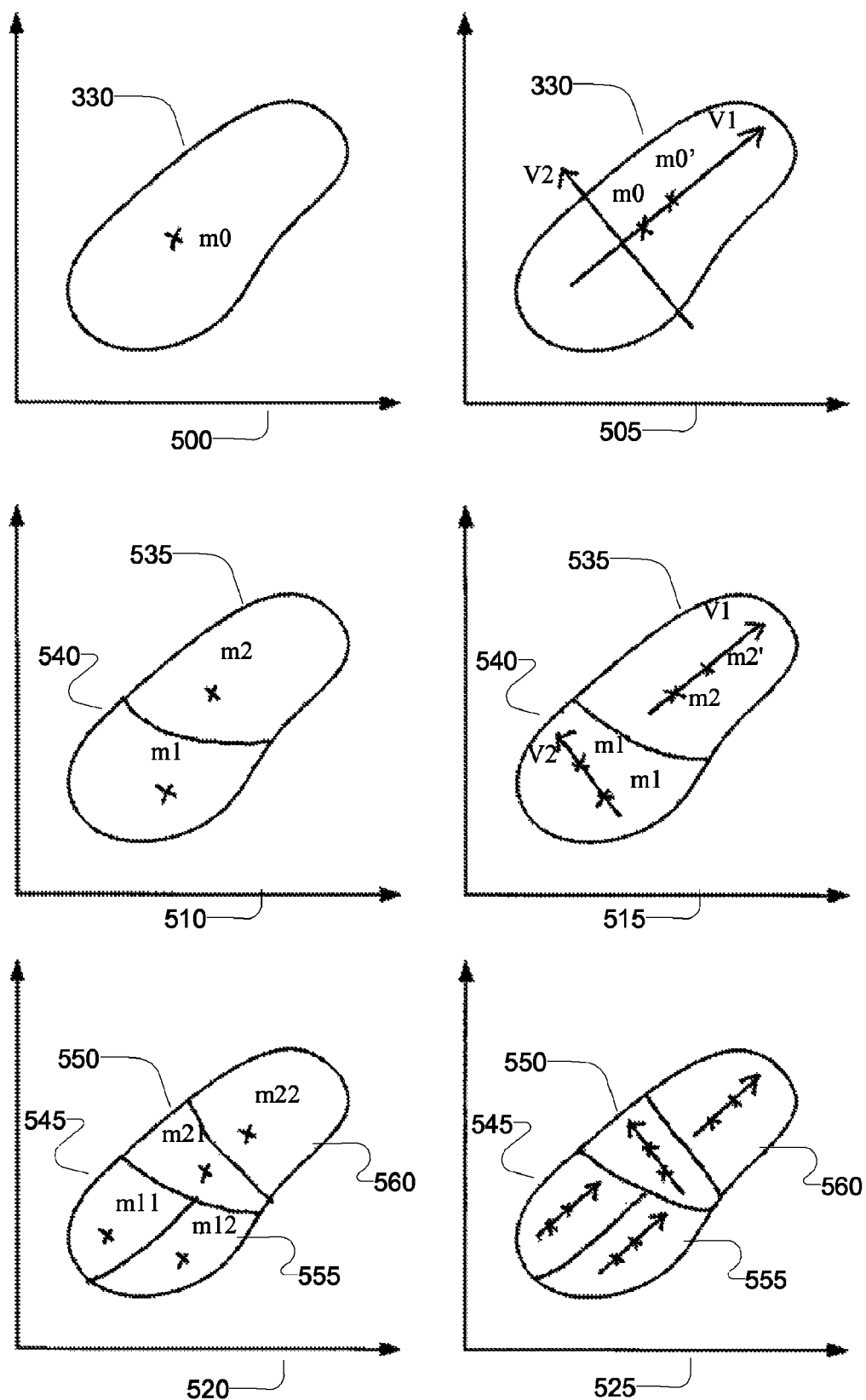
FIG. 5 illustrates an embodiment of the tree-structured hierarchical decomposition method that selects a principal component of the overall set for partitioning a cluster based on variance of the cluster.

FIG. 5 illustrates an embodiment of initial cluster seed computation module 130 that selects a principal component of the overall set of feature vectors based on the variance of a cluster for partitioning the cluster. For example, if the variance of a cluster indicates that the second principal component of the entire set of feature vectors is in the direction of maximum variance of the cluster, then the second principal component is used for computing the seed vectors for partitioning the clusters. FIG. 5, snapshot 515 shows 540 as an example of a cluster that selects the second principal component for computing the seeds. In contrast, the previous embodiment of initial cluster seed computation module 130 always selects the first principal component for computing the seeds for every cluster, irrespective of the variance of the cluster. In general, the principal component selected for partitioning a cluster is the principal component of the overall feature set that is in the direction of the maximum variance of the cluster being partitioned. This embodiment of initial cluster seed computation module 130 is less computationally intensive compared to the embodiment that computes the first principal component for each cluster, since the principal component analysis is performed only for the overall set of feature vectors. However this embodiment is more computationally intensive than the embodiment that uses the first principal component for partitioning every cluster. The resulting clusters obtained from this embodiment may be inferior to the clusters obtained by the embodiment that computes the first principal component for each cluster but are expected to be superior to the results of the embodiment that uses the first principal component of the overall feature vector set for all clusters. The snapshot 500 shows the overall data set as the first cluster 330 for the root node with the centroid m0. The vector V1 in snapshot 305 is the first principal component of the cluster 330 and the vector V2 is the second principal component of the cluster 330. The initial cluster seed computation module 130 analyzes cluster 330 and determines vector V1 as the vector along the maximum variance of the cluster 330. The initial cluster seed computation module 130 computes seed m0'=m0+εV1 and provides the set of initial seeds {m0, m0} to the clustering module 160. The clustering module 160 partitions the cluster 330 into two clusters 535 and 540. The procedure to partition is repeated for the clusters 535 and 540. The centroids m1 and m2 of the clusters 535 and 540 respectively are computed. The initial cluster seed computation module 130 determines that the second principal component vector V2 is along the direction of maximum variance for cluster 540 whereas the first principal component vector V1 is along the direction of the maximum variance for cluster 535. The initial cluster seed computation module 130 computes m1'=m1+εV2 and m2'=m2+εV1 and provides the initial seeds {m1, m1} and {m2, m2} of the clusters 540 and 535 respectively to the clustering module 160. The clustering module 160 partitions the cluster 535 to obtain clusters 550 and 560 and partitions the cluster 540 to obtain clusters 545 and 555 as shown in snapshot 520. Snapshot 525 illustrates how the process continues.

PCA-Based Bit-Vector Generation of Cluster Seeds

In a second set of embodiments, the initial cluster seed computation module 130 performs a bit-vector generation of cluster seeds and associates each feature vector with a bit vector calculated using the principal component vector information provided by the PCA module 150. The feature vectors are projected onto various principal components to compute projected feature vectors. Each bit vector component is computed based on the distribution of projected feature vectors.

Since the projected feature vectors lie along a straight line, determination of their distribution is computationally less intensive than determination of distribution of the feature vectors themselves. Several feature vectors may be mapped to the same bit vector value. All feature vectors mapped to a bit vector form a potential initial cluster. If the number of clusters so obtained is more than the desired number of clusters k, adjacent clusters may be combined to reduce the number of clusters. The centroids of the initial clusters are used as the cluster seeds for running a clustering algorithm.

Figure 6:
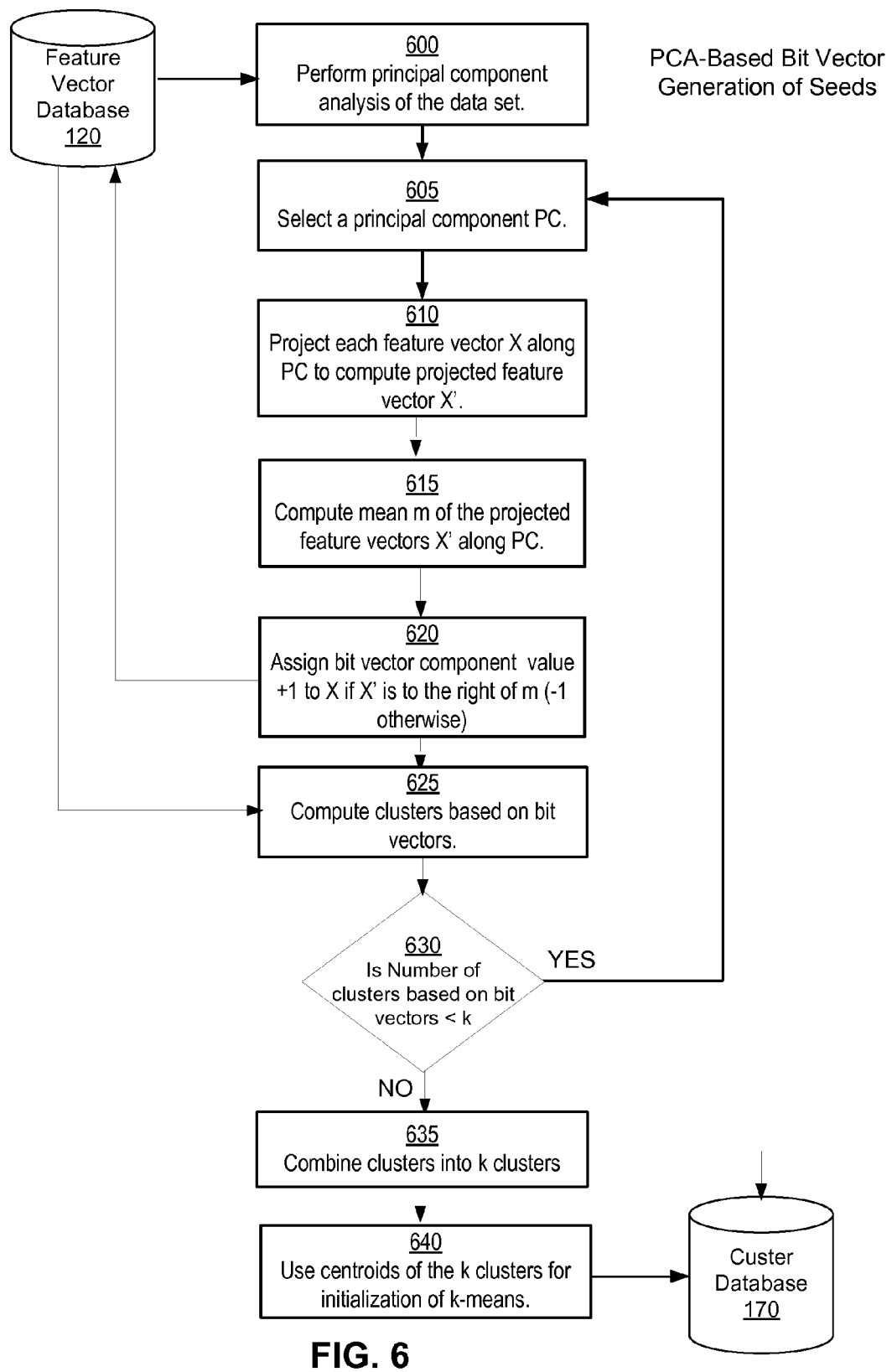
FIG. 6 is a flowchart of the process illustrating generation of cluster seeds by mapping features vectors to bit-vectors computed using principal component analysis.

FIG. 6 is a flowchart of the process performed by an embodiment of initial cluster seed computation module 130 illustrating generation of cluster seeds using bit-vectors computed using principal component analysis. The initial cluster seed computation module 130 uses the PCA module 150 for performing 600 a principal component analysis of the entire set of input feature vectors, to obtain a set of principal component vectors V1 through Vn.

For each feature vector, the initial cluster seed computation module 130 initializes a bit vector that contains a number of bits equal to the number of principal components that will be used to cluster the feature vectors. The initial cluster seed computation module 130 computes the bit vector components for each feature vector corresponding to principal components of the data set. A principal component is selected 600 for calculating the corresponding bit-vector component values for all feature vectors. The principal components may be selected 600 in order starting with first principal component V1 for the first iteration, followed by the second principal component V2, for the second iteration, and so on. The number of iterations depends on the desired number of initial cluster seeds k. For example, if there are n iterations, the number of clusters obtained is $2^n$ assuming there is at least one feature vector mapped to each bit vector value. In one embodiment, the number of iterations required for computing the bit vectors for generating k clusters can be computed as $\lceil \log_2 k \rceil$.

The initial cluster seed computation module 130 projects 610 each feature vector along the selected principal component to compute the corresponding projected feature vector. The projected feature vectors are stored in the feature vector database 120. The initial cluster seed computation module 130 computes 615 the mean m of all the projected feature vectors. The initial cluster seed computation module 130 then assigns 620 a bit vector component value for a feature vector based on the position of the corresponding projected feature vector with respect to the mean m.

For example, if the projected feature vector is on a particular side of the mean m, the bit vector component for the corresponding feature vector is assigned a value +1, and if the projected feature vector is on the opposite side of the mean, the bit vector component is assigned a value −1. Hence, the bit vector component of a feature vector indicates the position of the corresponding projected feature vector with respect to the mean m. In some embodiments, the median of the projected feature vectors is used instead of the mean to partition the projected feature vector. Accordingly, the median m' of the projected feature vectors is computed and if a projected feature vector is on a particular side of the median m' the bit vector component for the corresponding feature vector is assigned a value +1, and if the projected feature vector is on the opposite side of the median m', the bit vector component is assigned a value −1. The use of a median ensures that the set of feature vectors assigned to value +1 for a bit vector component has the same cardinality as the set of feature vectors assigned to value −1 for the same bit vector component. Hence, the use of median achieves a balanced distribution of feature vectors in each dimension corresponding to the bit vector components.

The initial cluster seed computation module 130 computes 625 the total number of clusters computed based on the distinct values of the bit vectors mapped to least one feature vector and compares 630 it with the desired number of clusters k. All feature vectors assigned to the same bit vector value are considered part of an initial cluster. If the number of initial clusters is less than the desired number of clusters k, the initial cluster seed computation module 130 selects 605 another principal component and adds another bit-vector component. If the number of clusters is more than the desired number of clusters k, the initial cluster seed computation module 130 combines 635 the clusters to reduce the total number of clusters to k. The initial cluster seed computation module 130 provides the centroids of the k initial clusters as the initial cluster seeds to the clustering module 160 for clustering the overall feature vector set using a clustering algorithm, for example, k-means clustering algorithm.

Figure 7A:
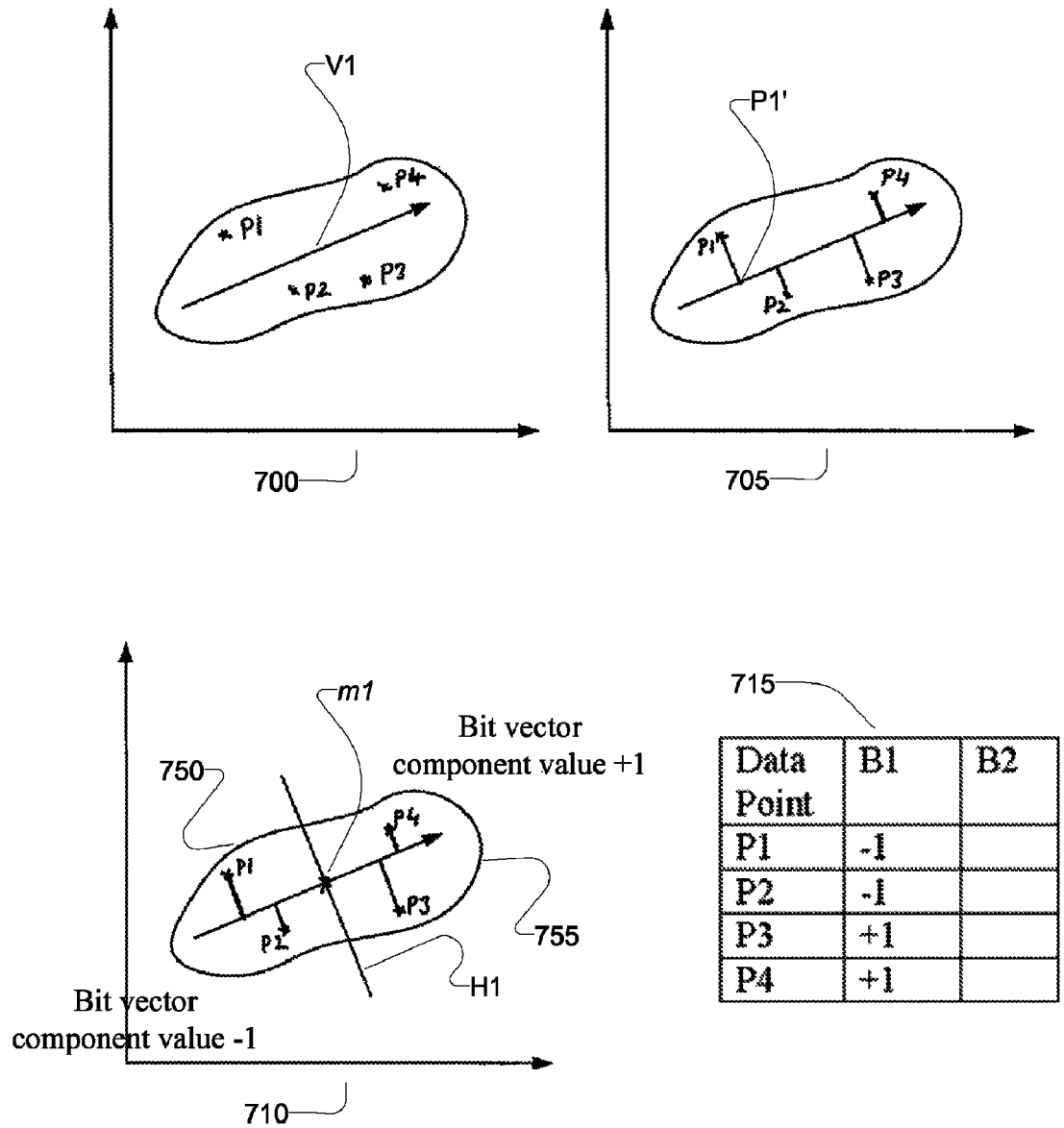
FIG. 7(a-b) illustrate the method that generates cluster seeds by associating feature vectors with bit-vectors computed using principal component analysis.
Figure 7B:
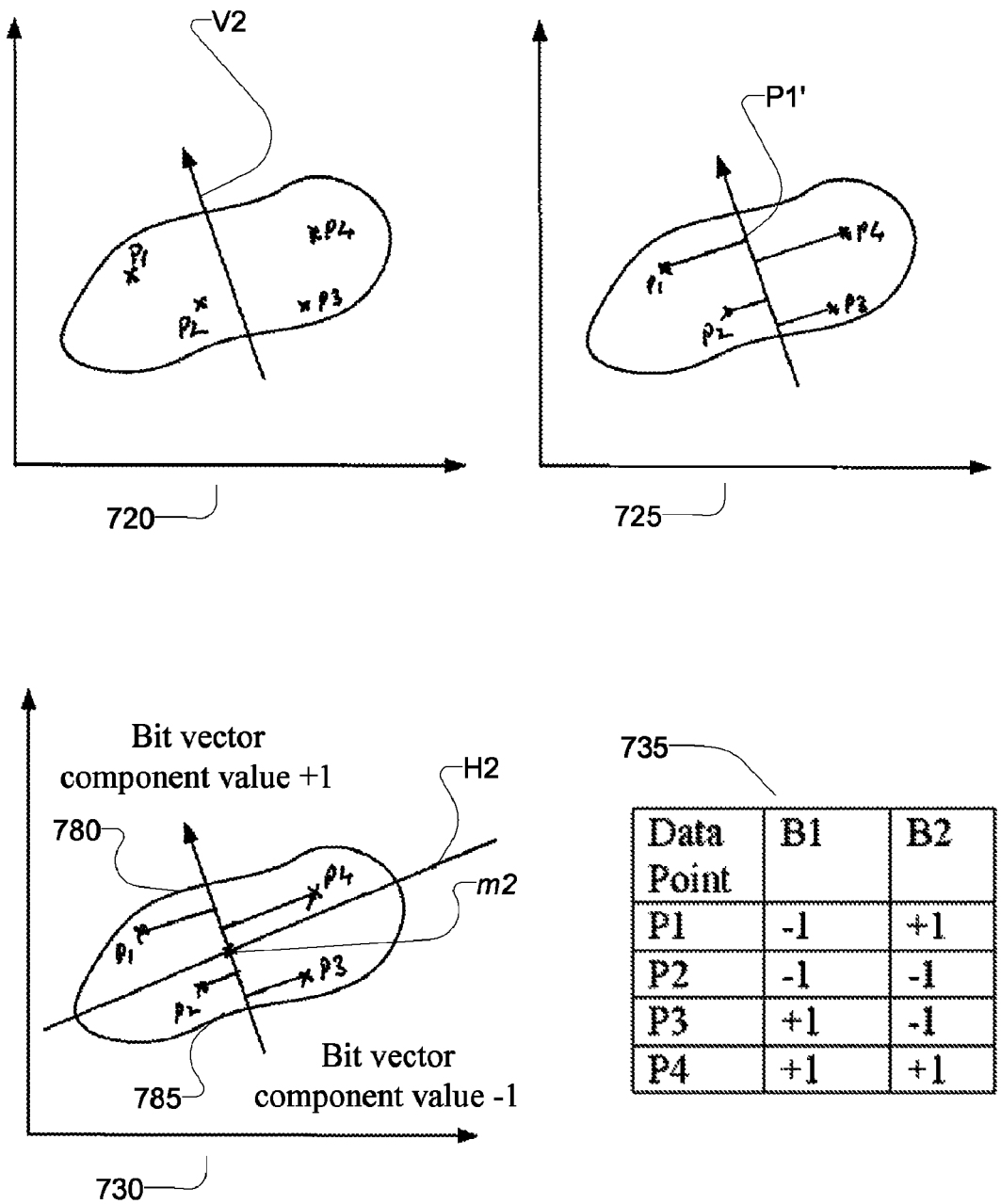

FIG. 7 illustrates the PCA-based bit-vector algorithm for computing initial cluster seeds performed by the initial cluster seed computation module 130 using snapshots of data computed at various stages. Snapshot 700 shows the overall data set with example data points P1, P2, P3 and P4 and the first principal component V1 computed by the PCA module 150. The data points are projected by the initial cluster seed computation module 130 onto the first principal component vector V1 to compute the projected feature vectors, for example, P1' as shown in snapshot 705. The initial cluster seed computation module 130 computes the mean m1 of the projected feature vectors and assigns a bit vector component value B1=+1 to feature vectors that project onto one side of the mean m1 and assigns bit vector component value B1=−1 to the feature vectors that project onto the other side of mean m1. It can be seen that the two partitions of feature vectors computed based on a bit vector component value are separated by a hyper-plane H1. The mapping of feature vectors to bit vector components is shown in table 715 stored in the feature vector database 120. As shown in snapshot 710, there are only two initial clusters since there are only two possible bit-vector values.

The initial cluster seed computation module 130 computes a second bit-vector component as shown in snapshots 720, 725, and 730 based on the second principal component V2. The initial cluster seed computation module 130 projects feature vectors onto the second principal component V2 to compute the projected feature vectors, for example, P1". The initial cluster seed computation module 130 further computes the mean m2 of the projected feature vectors and assigns values for bit vector component B2 to the feature vectors based on position of the corresponding projected feature vector with respect to the mean m2. All feature vectors 780 with the projected feature vectors on one side of the mean m2 are assigned the bit component vector value B2=+1 and the feature vectors 785 with projected feature vectors on the other side of the mean m2 are assigned the bit component vector value B2=−1. The sets 780 and 785 are separated by the hyper-plane H2. The table 735 stored in the feature vector database 120 shows the mapping of the data points to the bit vector components. As shown in table 735 there are four possible bit vector values based on two bit vector components. If necessary, the initial cluster seed computation module 130 computes additional bit vector components. Based on the bit vector components values in 735, four initial clusters are available. Bit vector (−1, +1) corresponds to the intersection of 750 and 780; bit vector (−1, −1) corresponds to the intersection of 750 and 785; bit vector (+1, −1) corresponds to the intersection of 755 and 785; and bit vector (+1, +1) corresponds to the intersection of 755 and 780.

The above embodiment of initial cluster seed computation module 130 partitions the data at each stage into two partitions for each principal component. If the variance of the data set along each principal component selected is approximately the same, the initial clusters computed by this embodiment are likely to be close to natural clusters of the feature vector set. However if the feature vector set has a very high variance along the first principal component and much smaller variance along other principal components, the initial partitions may not be close to natural partitions. Hence, an alternative embodiment of initial cluster seed computation module 130 creates more than two partitions along a principal component if necessary and ignores some of the principal components that correspond to very small variance. Accordingly, this embodiment of initial cluster seed computation module 130 assigns the feature vectors to tuples instead of bit-vectors, such that a tuple component can have more than two possible values. The initial cluster seed computation module 130 precomputes the variance along the various principal components to determine the number of tuple component values associated with a principal component based on the variance along the principal component.

Figure 8:
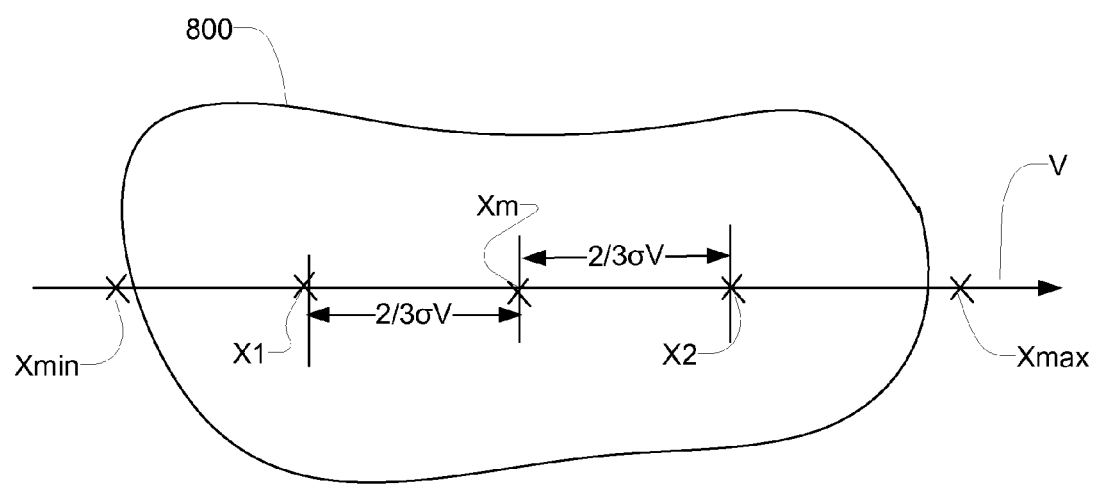
FIG. 8 illustrates how a cluster can be divided into four clusters based on distribution of feature vectors projected along a principal component.

The initial cluster seed computation module 130 uses the distribution of the projected feature vectors onto the principal component to determine the number of partitions along a principal component. For example, the initial cluster seed computation module 130 may determine that the tuple component based on the first principal component V is assigned four possible values 1, 2, 3, and 4. FIG. 8 illustrates an example computation for dividing a set of feature vectors 800 into four partitions corresponding to four possible values of tuple components. For example, if $\sigma$ represents the standard deviation of the projected feature vectors, the initial cluster seed computation module 130 computes $X_m$, the mean of the projected feature vectors and $X1=X_m-(2/3)\sigma V$, $X2=X_m+(2/3)\sigma V$ as two vectors on either side of $X_m$ along the vector V. The vectors X1 and X2 are calculated such that approximately a quarter of projected feature vectors lie between X1 and $X_m$, and another quarter between $X_m$ and X2 assuming a normal distribution of the projected feature vectors along the principal component. As shown in FIG. 8, Xmin represents a vector such that no projected feature vector lies to its left and Xmax represents a vector such that no projected feature vector lies to its right. The initial cluster seed computation module assigns features vectors with projected feature vectors between Xmin and X1, tuple component value 1; feature vectors with projected features between X1 and $X_m$, tuple component value 2; feature vectors with projected features between $X_m$ and X2, tuple component value 3; and feature vectors with projected feature vectors between X2 and Xmax, tuple component value 4. An advantage of this embodiment of initial cluster seed computation module 130 is that the number of initial clusters obtained is not restricted to a power of two as required by the bit-vector based cluster seed computation. The initial cluster seed computation module 130 can predetermine the number of initial clusters to a value closer to the desired number of clusters. As a result, the step of combining 635 the clusters to obtain fewer clusters may either be eliminated or require less computation.

In one embodiment the partitioning of the projected feature vectors along a dimension into more than two partitions can be performed in a recursive fashion. For example, the projected feature vector set can be divided into two subsets using the average (mean or median) of the projected feature vectors. Each subset can be further partitioned into two smaller subsets by computing the average of the subset and partitioning the projected feature vectors of the subset using the average of the subset. Hence, recursively each subset of the projected feature vectors can be partitioned into a required number of smaller subsets.

In some embodiments, the initial cluster seed computation module 130 combines 635 the clusters into larger clusters by selecting the smallest cluster, i.e., the cluster with the fewest number of feature vectors assigned to it and merging it with another cluster adjacent to it. A cluster is considered adjacent to another cluster if it shares a boundary with the cluster. The initial cluster seed computation module 130 repeats the process of finding the smallest cluster from the remaining set of clusters and merging it with an adjacent cluster until the desired number of clusters is reached. This process combines 635 the clusters without creating a huge disparity between the sizes of the largest cluster and the smallest cluster.

Some embodiments of initial cluster seed computation module 130 use eigen-values corresponding to the principal components computed by the PCA module 150 to determine the set of principal components to be used for generation of initial cluster seeds. The eigen-value associated with a principal component is a measure of the standard deviation of the principal component. An embodiment of initial cluster seed computation module 130 considers only the top few (e.g., 3-6) principal components obtained by arranging the principal components in a decreasing order of eigen-values. Another embodiment of initial cluster seed computation module 130 considers only the top few principal components obtained by arranging the principal components in a decreasing order of eigen-values such that the sum of their eigen-values exceeds a fixed percentage (for example 70%) of the total eigen-values of all principal components. The top few principal components are considered significant since they dominate the total variance of the overall feature vectors space. The use of eigen-values to select the top few dominant principal components can be applied to other PCA based seed generation algorithms discussed herein, for example, the tree structured generation of cluster seeds discussed above or the k-d tree based partitioning discussed below.

K-d Tree Based Partitioning for Generation of Cluster Seeds

In a third set of embodiments, the initial cluster seed computation module 150 uses a k-d tree based partitioning algorithm to hierarchically divide clusters similar to the tree-structured generation of cluster seeds. At each step, a cluster is identified and divided into smaller clusters. The hierarchy of clusters so formed can be arranged as a k-d tree. Each node of the k-d tree is associated with a cluster. The children of a parent node of the k-d tree are associated with clusters obtained by dividing the cluster associated with the parent node. The feature vectors associated with each cluster node are projected onto a vector computed by principal component analysis of either the overall set of feature vectors or the feature vectors associated with the cluster. The distribution of the projected feature vectors is used to partition the cluster into smaller clusters. Since the projected feature vectors lie along a straight line, the determination of the distribution of the projected feature vectors is less computationally intensive than the distribution of the feature vectors themselves. Various embodiments are possible based on how the vector is computed based on principal component analysis.

Figure 9:
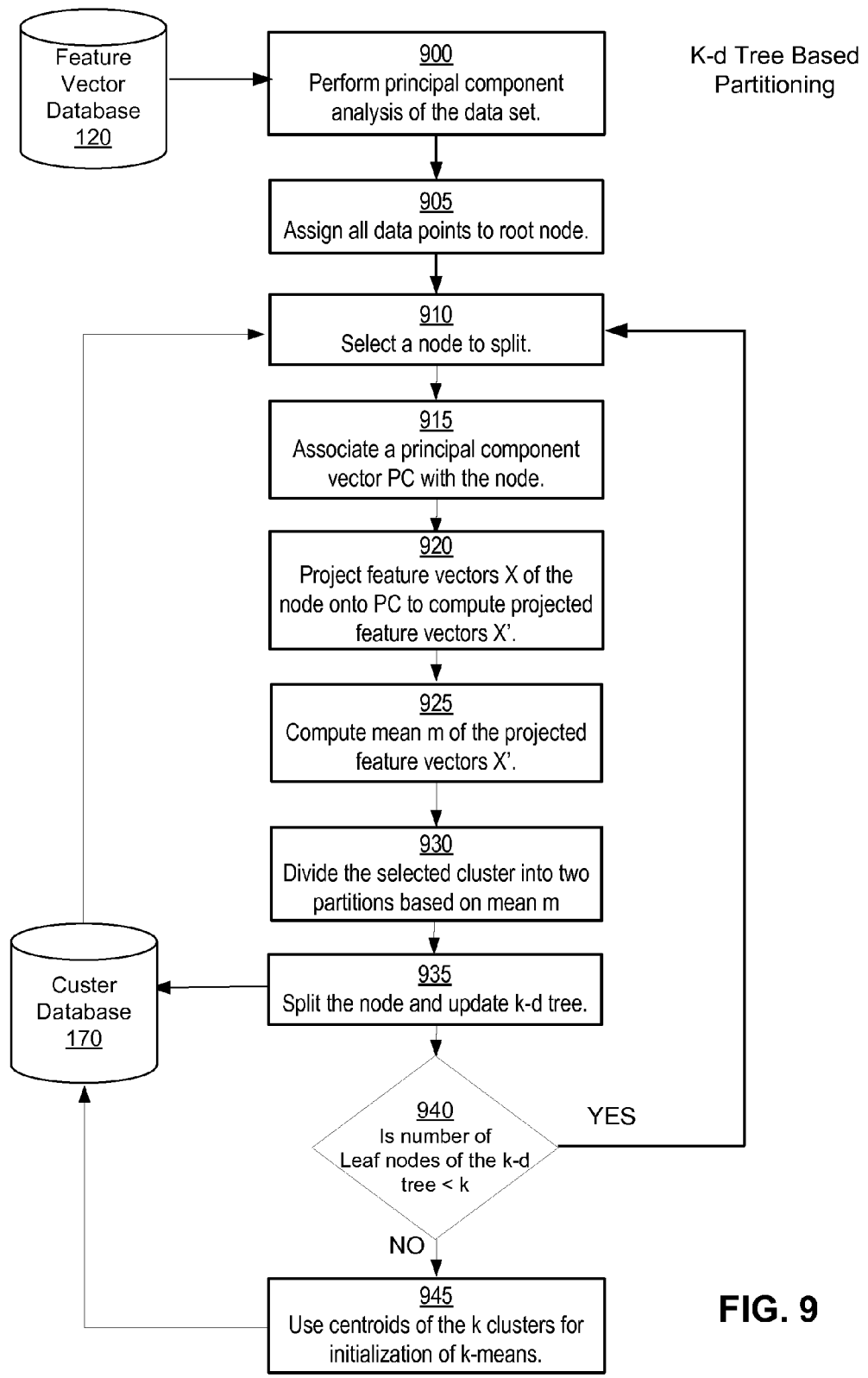
FIG. 9 is a flowchart of the process illustrating generation of cluster seeds using k-d tree generated using principal component analysis.

FIG. 9 is a flowchart of the process illustrating generation of cluster seeds using k-d tree based partitioning performed by the initial cluster seed computation module 130. The principal component analysis of the overall data set is performed 900 by the PCA module 150. The data structure representing the k-d tree is stored in the cluster database 170. The k-d tree structure is initialized with the root node assigned to all the feature vectors of the input data set. The next set of steps 910-940 is iteratively repeated by the initial cluster seed computation module 130 for splitting the nodes until a desired number of leaf nodes is obtained (the splitting of a node refers to the splitting of the cluster associated with the node). The initial cluster seed computation module 130 selects 910 one of the leaf nodes for splitting. In one embodiment, the initial cluster seed computation module 130 selects the leaf node with the largest number of feature vectors assigned to it. Another embodiment of initial cluster seed computation module 130 selects a leaf node so as to keep the k-d tree height balanced as far as possible. The initial cluster seed computation module 130 associates 915 the selected node with a vector V computed by the PCA module 150 using principal component analysis of either the overall feature vector set or the feature vectors of the cluster assigned to the selected node.

The initial cluster seed computation module 130 reads the feature vectors of the cluster associated with the selected node from the feature vector database 120 and projects 920 each feature vector onto the vector V to compute a projected feature vector. The initial cluster seed computation module 130 computes 925 the mean m of the projected feature vectors and uses the position of a projected feature vectors with respect to the mean to divide 930 the cluster associated with the node into two partitions. For example, the feature vectors of the cluster with projected feature vectors on one side of the mean m are assigned to one partition and the feature vectors with projected feature vectors on the other side of the mean m to the other partition. The initial cluster seed computation module 130 creates a cluster based on each partition and splits 935 the node to create two new nodes corresponding to the smaller clusters. The new nodes are added as child nodes of the node that is split and the k-d tree stored in the cluster database 170 is updated. Some embodiments of the initial cluster seed computation module 130 may divide a cluster associated with a node into more than two nodes if the number of feature vectors in the cluster is large and variance of the cluster along the associated principal component is high compared to the variance of the cluster along other principal components. Each leaf node can be associated with a potential initial cluster that can be used for determining initial cluster seeds. The initial cluster seed computation module 130 compares 940 the number of leaf nodes to the desired number of clusters k. If the number of leaf nodes is less than the desired number of clusters k, another node is selected 910 for being split, or else, the splitting of nodes is stopped. The initial cluster seed computation module 130 provides the centroids of the k clusters obtained as the initial cluster seeds to the clustering module 160 to perform clustering of the overall set of feature vectors.

Note that the k-d tree based partitioning algorithm is similar in flow to the tree-structured generation of cluster seeds discussed above since both algorithms perform a hierarchical division of the feature vector sets. However, the k-d tree based partitioning algorithm uses projected feature vectors along a principal component to partition a node whereas the tree-structured generation of cluster seeds uses k-means clustering algorithm for partitioning a node. The use of k-means algorithm to partition a node may result in better partitions compared to partitioning based on projected feature vectors but is relatively more computationally intensive than partitioning based on projected feature vectors.

Various embodiments of initial cluster seed computation module 130 may compute the vector V using principal component analysis performed by the PCA module 150 of either the entire set of feature vectors or the feature vectors of the cluster being partitioned. An embodiment of initial cluster seed computation module 130 uses the first principal component of the cluster being partitioned as the vector V. The first principal component of the cluster corresponds to the direction of maximum variance of the feature vectors. This increases the likelihood of obtaining better partitions. However computation of the principal components for each cluster can be a computation intensive operation.

Another embodiment of initial cluster seed computation module 130 uses the first principal component of the overall set of feature vectors as the vector V for partitioning of any cluster. This embodiment is less computationally intensive compared to the embodiment that computes the first principal component of each cluster since the principal component analysis is performed only for the overall set of feature vectors. However, the resulting clusters obtained from this embodiment may be inferior to the clusters obtained by the embodiment that computes the first principal component for each cluster.

Another embodiment of initial cluster seed computation module 130 selects a principal component of the overall set of feature vectors as the vector V for partitioning a given cluster. The principal component selected for partitioning a cluster is the principal component of the overall feature set that is in the direction of the maximum variance of the cluster. This embodiment is less computationally intensive compared to the embodiment that computes the first principal component for each cluster, since the principal component analysis is performed only for the overall set of feature vectors. The resulting clusters obtained from this embodiment may be inferior to the clusters obtained by the embodiment that computes the first principal component for each cluster but are expected to be superior to the results of the embodiment that uses the first principal component of the overall feature vector set for all clusters.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method performed by a computer system for clustering a plurality of multi-dimensional feature vectors, the feature vectors describing features of spatial-temporal entities, the method comprising:
   storing in a database of the computer system a plurality of feature vectors describing features of spatial-temporal entities;
   selecting, by the computer system, a subset of the stored feature vectors;
   determining, by the computer system, a set of initial seed vectors by applying a principal component analysis (PCA) algorithm to the selected subset of the feature vectors;
   clustering, by the computer system, the plurality of feature vectors using a k-means clustering algorithm comprising:
      providing the plurality of initial seed vectors as initial cluster seeds for the k-means clustering algorithm;
      determining a set of initial clusters of the feature vectors based on the initial cluster seeds using the k-means clustering algorithm; and
      iteratively refining the set of initial clusters to obtain a final set of clusters using the k-means clustering algorithm, wherein each of the final clusters comprises a subset of the plurality of feature vectors; and
   storing the final set of clusters in the database.

2. The method of claim 1, wherein the PCA algorithm for determining the set of initial seed vectors comprises hierarchically dividing the selected feature vectors into clusters.

3. The method of claim 1, wherein each initial seed vector is a centroid of an initial cluster.

4. The method of claim 2, wherein hierarchically dividing the plurality of feature vectors for determining the set of seed vectors comprises determining seed vectors at each level of the hierarchical process, the seed vectors used for determining clusters for the next level.

5. The method of claim 4, wherein the seeds at each level are selected such that a vector computed by the principal component analysis algorithm passes through the seeds at the level.

6. The method of claim 4, wherein the seeds at each level are selected such that a first principal component of the plurality of feature vectors passes through the seeds at the level.

7. The method of claim 1, wherein seeds at each level are selected such that a principal component of the cluster that is indicative of a direction of maximum variance of the cluster passes through the seeds at the level.

8. The method of claim 1, wherein iteratively refining the set of initial clusters comprises:
   determining a first point at a centroid of the cluster;
   determining a vector using the principal component analysis of feature vectors belonging to the plurality of feature vectors;
   determining a second point located adjacent to the first point in the direction of the vector; and
   dividing the cluster into smaller clusters by using the k-means clustering algorithm based on an initial codebook comprising the first point and the second point.

9. The method of claim 8, wherein the vector is in the direction of a first principal component of the cluster.

10. The method of claim 8, wherein the vector is in the direction of a first principal component of the input set of data points.

11. The method of claim 8, wherein the vector is in the direction of a principal component of the cluster indicative of maximum variance of the cluster.

12. The method of claim 1, wherein determining a set of seed vectors comprises hierarchical division of the plurality of feature vectors by partitioning a cluster into smaller clusters, wherein the partitioning comprises:
   projecting feature vectors onto a principal component of the plurality of feature vectors; and
   partitioning the cluster into smaller clusters based on a statistical distribution of the projected feature vectors.

13. The method of claim 12, wherein each feature vector of the cluster is projected onto a principal component of the plurality of feature vectors.

14. The method of claim 12, wherein each feature vector of the cluster is projected onto a principal component of the cluster being partitioned.

15. The method of claim 12, wherein each feature vector of the cluster is projected onto a principal component of the plurality of feature vectors, wherein the principal component is indicative of a direction of maximum variance of the cluster being partitioned.

16. The method of claim 12, wherein partitioning of the cluster comprises:
   determining a mean of the projected feature vectors; and
   partitioning the cluster based on the orientation of each projected feature vector with respect to the mean.

17. The method of claim 1, wherein determining a set of seed vectors comprises hierarchical division of the plurality of feature vectors based on a k-d tree.

18. The method of claim 1, wherein selecting, by the computer system, the subset of feature vectors comprises:
   projecting each feature vector along a plurality of principal components of the plurality of feature vectors;
   assigning a tuple to each feature vector wherein each tuple component corresponds to a principal component and a value of the tuple component is determined by a distribution of the projected feature vectors along the principal component; and determining a set of initial clusters of feature vectors, wherein each initial cluster corresponds to a tuple value.

19. The method of claim 18, further comprising:
combining a plurality of initial clusters to a bigger initial cluster to reduce the number of initial clusters.

20. The method of claim 19, wherein the plurality of initial clusters selected for combining to a bigger cluster comprises initial clusters adjacent to each other.

21. The method of claim 18, wherein each feature vector of the subset of feature vectors is a centroid of an initial cluster.

22. The method of claim 18, wherein a tuple is a bit vector and a tuple component is a binary value.

23. The method of claim 18, further comprising partitioning the projected feature vectors along a principal component into a plurality of partitions, wherein each tuple component value corresponds to a partition.

24. A computer-implemented system for clustering a plurality of multi-dimensional feature vectors, the feature vectors describing features of spatial-temporal entities, the system comprising:
a database storing a plurality of feature vectors, the feature vectors describing features of spatial-temporal entities;
a computer processor; and
a computer-readable storage medium storing computer program modules configured to execute on the computer processor, the computer program modules comprising:
an initial cluster seed computation module configured to:
select a subset of the stored feature vectors;
determine a set of initial seed vectors by applying a principal component analysis (PCA) algorithm to the selected subset of the feature vectors; and
a clustering module configured to:
cluster the plurality of feature vectors using a k-means clustering algorithm comprising:
providing the plurality of initial seed vectors as initial cluster seeds for the k-means clustering algorithm;
determining to produce a set of initial clusters of the feature vectors based on the initial cluster seeds using the k-means clustering algorithm; and
iteratively refining the set of initial clusters to obtain a final set of clusters using the k-means clustering algorithm, wherein each of the final clusters comprises a subset of the plurality of feature vectors; and
store the final set of clusters in the database.

25. A computer program product having a non-transitory computer-readable storage medium storing computer-executable code for clustering a plurality of multi-dimensional feature vectors, the feature vectors describing features of spatial-temporal entities, the code comprising:
an initial cluster seed computation module configured to:
select a subset of the stored feature vectors from a database storing a plurality of feature vectors, the feature vectors describing features of spatial-temporal entities;
determine a set of initial seed vectors by applying a principal component analysis (PCA) algorithm to the selected subset of the feature vectors; and
a clustering module configured to:
cluster the plurality of feature vectors using a k-means clustering algorithm comprising:
providing of the plurality of initial seed vectors as initial cluster seeds for the k-means clustering algorithm;
determining a set of initial clusters of the feature vectors based on the initial cluster seeds using the k-means clustering algorithm; and
iteratively refining the set of initial clusters to obtain a final set of clusters using the k-means clustering algorithm, wherein each of the final clusters comprises a subset of the plurality of feature vectors; and
store the final set of clusters in the database.

\* \* \* \* \*

UNITED STATES PATENT AND TRADEMARK OFFICE
CERTIFICATE OF CORRECTION

| | |
|---|---|
| PATENT NO. | : 8,385,662 B1 |
| APPLICATION NO. | : 12/432989 |
| DATED | : February 26, 2013 |
| INVENTOR(S) | : Sangho Yoon et al. |

Page 1 of 1

It is certified that error appears in the above-identified patent and that said Letters Patent is hereby corrected as shown below:

In the Claims:

Column 18, line 1, after "determining," delete "to produce".

Column 18, line 27, after "providing," delete "of".

Signed and Sealed this
Thirteenth Day of August, 2013

Teresa Stanek Rea
*Acting Director of the United States Patent and Trademark Office*